United States Patent
Zhao et al.

(10) Patent No.: US 10,692,225 B2
(45) Date of Patent: Jun. 23, 2020

(54) SYSTEM AND METHOD FOR DETECTING MOVING OBJECT IN AN IMAGE

(71) Applicant: Shanghai Xiaoyi Technology Co., Ltd., Shanghai (CN)

(72) Inventors: Lili Zhao, Beijing (CN); Zhao Li, Beijing (CN)

(73) Assignee: SHANGHAI XIAOYI TECHNOLOGY CO., LTD., Shanghai (CN)

(*) Notice: Subject to any disclaimer, the term of this patent is extended or adjusted under 35 U.S.C. 154(b) by 181 days.

(21) Appl. No.: 15/917,565

(22) Filed: Mar. 9, 2018

(65) Prior Publication Data
US 2018/0260964 A1    Sep. 13, 2018

(30) Foreign Application Priority Data
Mar. 9, 2017   (CN) .......................... 2017 1 0137069

(51) Int. Cl.
G06T 7/254    (2017.01)
G06K 9/62     (2006.01)
G06K 9/38     (2006.01)
G06K 9/46     (2006.01)

(52) U.S. Cl.
CPC .............. G06T 7/254 (2017.01); G06K 9/38 (2013.01); G06K 9/6212 (2013.01); G06K 9/46 (2013.01); *G06K 2009/4666* (2013.01)

(58) Field of Classification Search
CPC ........ G06T 7/254; G06K 9/38; G06K 9/6212; G06K 9/46; G06K 2009/4666
See application file for complete search history.

(56) References Cited

U.S. PATENT DOCUMENTS

| | | | |
|---|---|---|---|
| 6,456,730 B1* | 9/2002 | Taniguchi | G06K 9/3241 382/103 |
| 2004/0101162 A1* | 5/2004 | Higaki | G01C 11/00 382/103 |
| 2008/0144961 A1* | 6/2008 | Litzenberger | G06K 9/00624 382/270 |
| 2011/0157425 A1* | 6/2011 | Nakayama | H04N 5/23245 348/234 |
| 2011/0177841 A1* | 7/2011 | Attwood | G06T 7/254 455/556.1 |
| 2011/0254833 A1* | 10/2011 | McDaniel | G06T 17/05 345/419 |

(Continued)

OTHER PUBLICATIONS

Ovseník, L., A. Kazimírová Kolesárová, and J. Turán. "Object detection in video surveillance systems." Carpathian Journal of Electronic and Computer Engineering 3 (2010): 137. (Year: 2010).*

*Primary Examiner* — Bobbak Safaipour
(74) *Attorney, Agent, or Firm* — Cantor Colburn LLP

(57) ABSTRACT

A moving object detection method and apparatus are disclosed. The method may include: obtaining a first image and a second image of a scene; determining a difference of the first image and the second image; performing a binarization operation on the difference of the first image and the second image, to generate a binary image; determining the number of pixels whose values are nonzero in each column of the binary image, to generate a column pixel histogram; and determining whether a moving object is present in the scene based on the column pixel histogram.

19 Claims, 6 Drawing Sheets

(56) References Cited

U.S. PATENT DOCUMENTS

| | | | |
|---|---|---|---|
| 2013/0044953 A1* | 2/2013 | Du | H04N 1/403 |
| | | | 382/170 |
| 2013/0286241 A1* | 10/2013 | Spampinato | H04N 5/23254 |
| | | | 348/222.1 |
| 2015/0334398 A1* | 11/2015 | Socek | G06T 7/11 |
| | | | 375/240.26 |
| 2017/0124719 A1* | 5/2017 | Long | G06K 9/344 |
| 2019/0011992 A1* | 1/2019 | Zhao | G06K 9/00355 |
| 2019/0266433 A1* | 8/2019 | Foroughi | G06K 9/3233 |

\* cited by examiner

SYSTEM AND METHOD FOR DETECTING MOVING OBJECT IN AN IMAGE

CROSS-REFERENCE TO RELATED APPLICATION

This application is based upon and claims priority from Chinese Patent Application No. 201710137069.2, filed on Mar. 9, 2017, the disclosure of which is expressly incorporated herein by reference in its entirety.

TECHNICAL FIELD

The present disclosure generally relates to image processing technology, and more specifically to a system and method for detecting moving objects in an image.

BACKGROUND

In the field of image processing, the use of motion detection technology can automatically detect motion scenes in videos, which can reduce the cost of manual monitoring and increase monitoring efficiency and effectiveness. As the foundation for motion detection recording technology and an important component of smart video cameras, motion detection technology has been embedded into the camera firmware of an increasing number of smart video cameras.

There are three types of conventional motion detection methods: the optical flow method, the inter-frame difference method, and the background subtraction method. In the optical flow method, each pixel point in the image is assigned a velocity vector to form an image motion field; at a given moment of the motion, the points in the image have a one-to-one relationship with the points on the three-dimensional object, and this relationship can be obtained from the projection relationship; a dynamic analysis on the image can be performed based on the characteristics of the velocity vector of each pixel point. If no moving object is present in the image, then the optical flow vector would change continuously across the entire image area; when a moving object is present in the image, the target and the image background would move relative to one another, so the velocity vector of the moving object is inevitably different from the velocity vector of the adjacent background area; thus, the moving object and its location are detected. Image difference methods are relatively straightforward and easy to implement. Therefore, these methods have now become the most widely used to detect moving targets. There are two types of image difference methods: the background subtraction method and the inter-frame difference method. The background subtraction method compares the current frame against the background reference model in a series of images to detect moving objects, and its performance depends on the background modeling technology used. The inter-frame difference method performs a difference operation on two or three adjacent frames in a series of video images to obtain the contour of a moving target.

However, the image difference methods, the background subtraction method and the inter-frame difference method, are highly sensitive to interference factors that cause changes in the scene, for example, lighting, plants swinging in the wind, etc. For example, in a night vision environment, a flying insect may lead to changes in the scene. Since conventional motion detection algorithms are highly sensitive to interference factors that cause changes in the scene, a motion detection alarm is triggered once a change in the scene is detected. However, this type of alarm is not desired; in other words, it is a false positive alarm. Therefore, there is a need to detect and identify moving objects, for example, flying insects, in a night vision environment to avoid false positive alarms.

The disclosed methods and systems address one or more of the problems listed above.

SUMMARY

Consistent with one embodiment of the present disclosure, a method for detecting moving objects in an image is provided. The method may include: obtaining a first image and a second image of a scene; determining a difference of the first image and the second image; performing a binarization operation on the difference of the first image and the second image, to generate a binary image; determining the number of pixels whose values are nonzero in each column of the binary image, to generate a column pixel histogram; and determining whether a moving object is present in the scene based on the column pixel histogram.

Consistent with another embodiment of the present disclosure, an apparatus for detecting moving objects in an image is provided. The apparatus includes a memory storing instructions. The apparatus also includes a processor configured to execute the instructions to: obtain a first image and a second image of a scene; determine a difference of the first image and the second image; perform a binarization operation on the difference of the first image and the second image, to generate a binary image; determine the number of pixels whose values are nonzero in each column of the binary image, to generate a column pixel histogram; and determine whether a moving object is present in the scene based on the column pixel histogram.

Consistent with yet another embodiment of the present disclosure, a non-transitory computer-readable storage medium is provided. The medium stores instructions that, when executed by a processor, cause the processor to perform a method for detecting moving objects in an image. The method may include: obtaining a first image and a second image of a scene; determining a difference of the first image and the second image; performing a binarization operation on the difference of the first image and the second image, to generate a binary image; determining the number of pixels whose values are nonzero in each column of the binary image, to generate a column pixel histogram; and determining whether a moving object is present in the scene based on the column pixel histogram.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
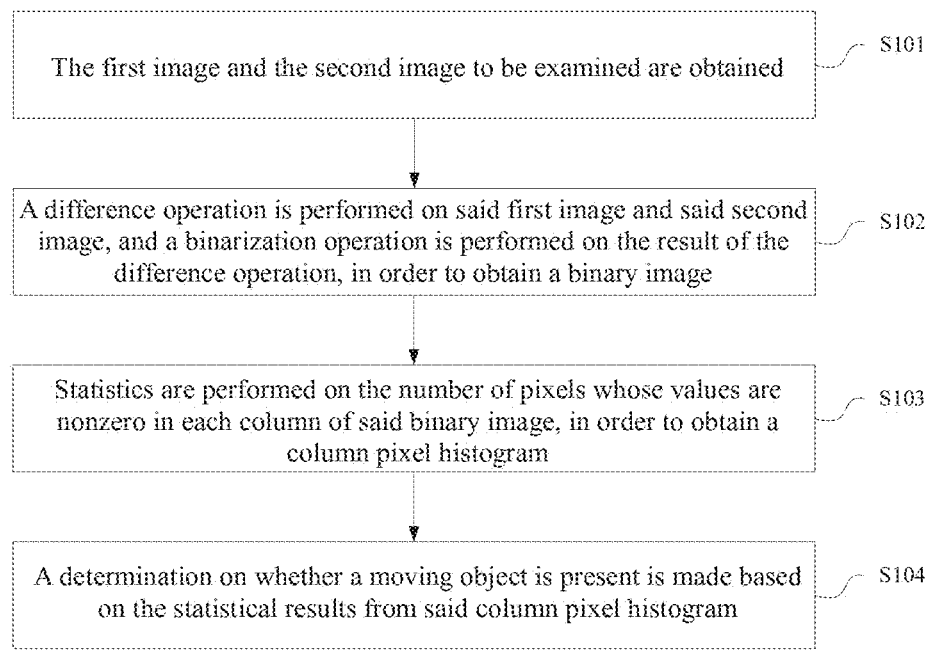
FIG. 1 is a flowchart of a method for detecting moving objects in an image, according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

As described in the "Background" section, the background subtraction method and the inter-frame difference method in the currently available technology are highly sensitive to interference factors that cause changes in the scene, for example, lighting, plants swings in the wind, etc. In a night vision environment, small flying insects or bugs may also lead to changes in the scene. Since conventional motion detection algorithms are highly sensitive to interference factors that cause changes in the scene, a motion detection alarm is triggered once a change in the scene is detected. However, this type of alarm is not desired. In other words, it is a false positive alarm. Therefore, there is a need to detect and identify moving objects in a night vision environment to avoid false positive alarms.

The present application discloses a method and system for detecting a moving object in an image. As used in the present application, "moving object" may refer to a small flying insect or bug. In one embodiment example of the present invention, statistics are performed on the binary image obtained from a binarization operation performed on the pixel difference result from the first image and the second image, in order to obtain the number of pixels whose values are nonzero in each column; then statistics are performed on the column pixel histogram obtained from the statistics, and the statistical results from the column pixel histogram are used to determine whether a moving object, such as a flying insect, is present. In other words, the technical solution provided by the present invention determines whether a moving object, such as a small flying insect, is present by leveraging the uniqueness of the statistical results from the pixel difference values between the first image and the second image when a moving object is present. Thus, the solution enables the detection of moving objects, such as a small flying insects, as distinguished from other objects in the images, which may further enable better surveillance outcomes in application scenarios in many fields.

Persons skilled in the art should understand that the "moving objects" described in the disclosed embodiments may refer to all kinds of moving objects, such as flying animals or flying insects that are commonly seen indoors, or other flying objects.

In order to make the aforementioned purpose, characteristics, and advantages of the present invention more evident and easier to understand, detailed descriptions are provided below on specific embodiment examples of the present invention in reference to the drawings attached.

FIG. 1 is a flowchart of a method for detecting moving objects in an image, according to an exemplary embodiment of the present disclosure. For example, the moving objects to be detected may be flying insects.

The moving object detection method shown in FIG. 1 may comprise the following steps.

Step S101: the first image and the second image to be examined are obtained.

Step S102: a difference operation is performed on the first image and the second image, and a binarization operation is performed on the result of the difference operation, in order to obtain a binary image.

Step S103: statistics are performed on the number of pixels whose values are nonzero in each column of the binary image, in order to obtain a column pixel histogram.

Step S104: a determination on whether a moving object is present is made based on the statistical results from the column pixel histogram.

In a specific embodiment, since a moving object, such as a flying insect, in its moving process will form a trail in two consecutive images that are recorded, the trailing in the images can be used to detect moving objects. First, in step S101, the first image and the second image to be examined are obtained. Specifically, the recording time points of the first image and the second image may be temporally consecutive. For example, it may be that the difference between the recording times of the first image and the second image is less than a set threshold; it may also be that the first image and the second image are two consecutive image frames in a video.

In a specific embodiment, in step S102, a difference operation is performed on the first image and the second image. Specifically, the difference operation may be performed on the pixel value of all pixels in the first image and the second image. Specifically, e0($x$, $y$) and e1($x$, $y$) are defined as the pixel values at coordinates (x, y) in the first image and the second image, respectively, and d(x, y) is defined as the result from the difference operation on pixel value e0($x$, $y$) and pixel value e1($x$, $y$), i.e. d(x, y)=|e0($x$, $y$)−e1($x$, $y$)|. The aforementioned difference operation is performed on all the pixels in the first image and the second image.

Further, a binarization operation is performed on the result of the difference operation to obtain a binary image. Specifically, the binary image has only two types of pixel values: zero and nonzero. For example, if the pixel value of a certain pixel is greater than the preset threshold, then it is binarized to the preset nonzero value; otherwise it is binarized to zero. In this embodiment example, the binary image can present the pixel difference between the first image and the second image in a more visual way.

In a specific embodiment, in step S103, statistics are performed on the number of pixels whose values are nonzero in each column of the binary image to obtain a column pixel histogram. Specifically, the number of pixels whose values are nonzero in each column of the binary image is obtained by performing statistics on the binary image, and the column pixel histogram is then obtained. In other words, the y-axis of the column pixel histogram is the number of pixels whose values are nonzero in each column of the binary image, and the x-axis of the column pixel histogram is the column of the binary image. In this embodiment example, the column pixel histogram can present the spatial distribution of the pixel difference between the first image and the second image in a visual way. If the number of pixels whose values are nonzero in a certain column in the column pixel histogram is large, then it shows that difference is present in a relatively large number of pixels in this column of the first image and the second image; in contrast, if the number of pixels whose values are nonzero in a certain column in the column pixel histogram is small, then it shows that difference is present in a relatively small number of pixels in this column of the first image and the second image.

Specifically, in the column pixel histogram f_hist, the x-axis is the column of the binary image f_thresh, and the y-axis is the number of pixels whose values are nonzero in each column. Let t(x, y) be the pixel value at coordinates (x, y) in the binary image f_thresh, height be the height of the binary image f_thresh, and width be the width of the binary image f_thresh; let hist(x) be the y-coordinate of column x in the column pixel histogram f_hist. First, the following formula is used to initialize the y-coordinate hist(x) in the column pixel histogram f_hist: hist(x)=0; x=0, . . . , width−1; then the following formula is used to calculate the y-coordinate hist(x) at x:

$$hist(x) = \begin{cases} hist(x); t(x, y) = 0 \\ hist(x) + 1; t(x, y) = \text{nonzero value} \end{cases}$$

$$x = 0, \ldots, \text{width} - 1; y = 0, \ldots, \text{height} - 1;$$

by this point, the column pixel histogram f_hist has been obtained.

In a specific embodiment, in step S104, a determination is made on whether a moving object is present based on the statistical results from the column pixel histogram. After obtaining the column pixel histogram in step S103, statistics can be performed on the column pixel histogram, and the statistical results from the column pixel histogram can then be used to determine whether a moving object is present in the first image and the second image. In other words, if a moving object is present in the first image and the second image, then it can be represented in the spatial distribution of the pixel difference between the first image and the second image, i.e. in the statistical results from the column pixel histogram. Therefore, the statistical results from the column pixel histogram can be used to determine whether a moving object is present.

In the embodiment example of the present invention, whether a moving object, such as a flying insect, is present is determined by leveraging the uniqueness of the statistical results from the pixel difference values between the first image and the second image, which enables the detection of moving objects, e.g., flying insects, as distinguished from other objects in the images, further enabling better surveillance outcomes in application scenarios in multiple fields.

In addition, the complexity of detecting moving objects using the moving object detection method provided by the embodiment example of the present invention and the amount of calculation required are both low, which may enhance the applicability of the moving object detection method.

Preferably, step S104 may comprise the following steps: the number of crests in the column pixel histogram is calculated; a determination is made on whether a moving object is present based on the number of crests.

In a specific embodiment, the column pixel histogram includes the number of pixels whose values are nonzero in each column of the binary image; since the number of pixels whose values are nonzero in each column of the binary image is different, statistics can be performed to obtain the number of crests in the column pixel histogram, i.e. the number of columns that stand out showing the number of nonzero pixels in the binary image. Since the spatial distribution of the pixel difference between the first image and the second image due to the presence of a moving object exhibits certain characteristics, the number of crests can be used to determine whether a moving object is present.

Further, the calculation of the number of crests in the column pixel histogram may comprise the following steps: all columns of the column pixel histogram are traversed; if in the column pixel histogram there is a column whose y-coordinate value is greater than the crest threshold, and the difference between the y-coordinate value and the y-coordinate value of the column that corresponds to the set x-axis interval is greater than the set difference threshold, then the number of crests increases by one.

In a specific embodiment, when determining the crests, not only should the y-coordinate value of the column where the crest is be greater than the crest threshold, the difference between the y-coordinate value of the column where the crest is and the y-coordinate value of the column that corresponds to the set x-axis interval should also be greater than the set difference threshold. Specifically, let hist(x) be the y-coordinate at x in the column pixel histogram f_hist, Δx be the x-axis interval, thresh be the set difference threshold, yThresh be the crest threshold, and CrestCount be the number of crests. When the following conditions are met simultaneously, the number of crests increases by one, CrestCount=CrestCount+1:

hist(x)−hist(x−Δx)>thresh;

hist(x)−hist(x+Δx)>thresh;

hist(x)>yThresh.

The number of crests CrestCount is obtained by traversing the x-axis of the column pixel histogram f_hist.

In a specific embodiment, the value range for the crest threshold yThresh may be [10, 30]; preferably, the crest threshold yThresh=20. Persons skilled in the art should understand that the crest threshold yThresh may also be configured at any other implementable numeric value depending on the actual application environment; it is not restricted by the embodiment example of the present invention.

Preferably, only one crest is retained among the columns within the set range interval in the column pixel histogram. In order to remove the impact of noise on the calculation result with regard to the number of crests, only one crest is retained among columns within the set range interval. Specifically, since the spatial distribution of the pixel difference between the first image and the second image due to the presence of a moving object exhibits certain characteristics, the number of crests can be used to determine whether a moving object is present. Let range be the range interval in the column pixel histogram f_hist, and x1 be the x-coordinate of a crest that already meets the aforementioned conditions, then when the following conditions are met simultaneously, the number of crests increases by one, i.e.

CrestCount=CrestCount+1;

hist($x$)−hist($x$−Δ$x$)>thresh;

hist($x$)−hist($x$+Δ$x$)>thresh;

hist($x$)>$y$Thresh;

∃!$x$∈($x$1−range,$x$1+range).

Further, when the number of crests is less than the minimum number threshold or greater than the maximum number threshold, it is determined that a moving object is present. Specifically, minNum is the minimum number threshold, and maxNum is the maximum number threshold, then when either of the following conditions is met, it is judged that a moving object is present:

CrestCount<minNum;

CrestCount>maxNum.

Preferably, step S104 may comprise the following steps: a determination is made on whether a moving object is present based on the effective column ratio; the effective column ratio is the ratio of the number of columns where the y-coordinate value is greater than the crest threshold to the number of columns where the y-coordinate value is greater than the noise threshold in the column pixel histogram. Specifically, since the spatial distribution of the pixel difference between the first image and the second image due to the presence of a moving object exhibits certain characteristics, the relationship between the columns where the difference exists and noise can be used to determine whether a moving object is present.

Specifically, noiseThresh is the noise threshold, filterCrestThreshCount is the number of columns greater than the crest threshold yThresh in the column pixel histogram f_hist, filterNoiseThreshCount is the number of columns greater than the noise threshold in the column pixel histogram f_hist, and ratio is the effective column ratio. The effective column ratio can be calculated using the following formula:

$$ratio = \frac{fiterCrestThreshCount}{filterNoiseThreshCount}.$$

Further, the determination of whether a moving object is present based on the effective column ratio may comprise the following steps: when the effective column ratio is less than the ratio threshold, it is determined that a moving object is present. Specifically, minRatio is the ratio threshold, then it is judged that a moving object is present when the following conditions are met:

ratio<minRatio.

Understandably, a determination on whether another object (e.g. a pedestrian) is present can also be made based on the relationship between the number of crests and the minimum number threshold or the maximum number threshold, and the relationship between the effective column ratio and the ratio threshold. Specifically, it is judged that a pedestrian is present when the following conditions are met simultaneously:

CrestCount≥minNum;

CrestCount≤maxNum;

ratio≥minRatio.

Preferably, the following steps may be included before step S103: an erosion operation is performed on the binary image to obtain an eroded image; the total number of pixels whose values are nonzero in the eroded image is calculated; when the total number of pixels is greater than the first set threshold, statistics are performed on the number of pixels whose values are nonzero in each column of the binary image.

Figure 2:
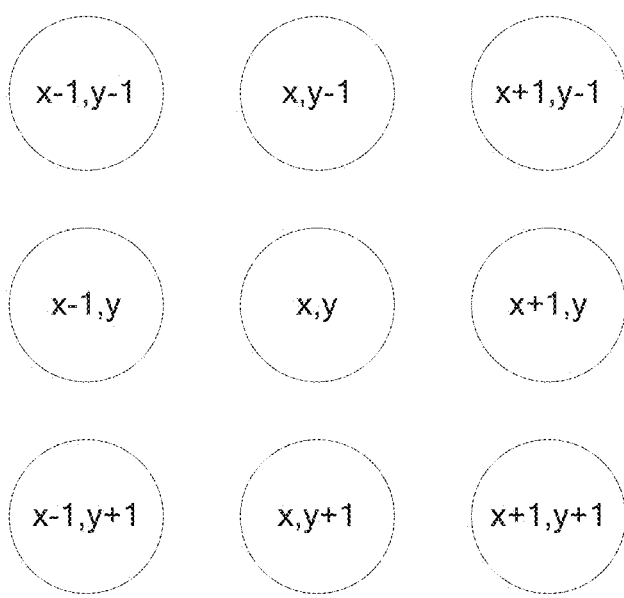
FIG. 2 is a schematic diagram illustrating spatial relationships between pixel p and its adjacent pixels in an erosion operation, according to an exemplary embodiment of the present disclosure.

In a specific embodiment, in order to reduce the impact of noise on the detection of moving objects, an erosion operation can be performed on the binary image. Specifically, de(x, y) is defined as the pixel value at coordinates (x, y) in the eroded image, and the process of calculating de(x, y) is the image erosion operation. Specifically, t(x, y) is the pixel value of pixel p at coordinates (x, y); t(x−1, y−1), t(x, y−1), t(x+1, y−1), t(x−1, y), t(x+1, y), t(x−1, y+1), t(x, y+1), and t(x+1, y+1) are defined, respectively, as the pixel values of the eight adjacent pixels to the top left, top, top right, left, right, bottom left, bottom, and bottom right of pixel p. Their spatial relationships are shown in FIG. 2. The pixel value de(x, y) at coordinates (x, y) in the eroded image can be obtained in the following manner: an AND operation is performed on pixel p and its eight adjacent pixels, and value assignment is made based on the resulting value from the AND operation.

It should be noted that the pixel value de(x, y) at coordinates (x, y) in the eroded image may also be obtained from an AND operation performed on pixel p and its 4 adjacent pixels; it is not restricted by the embodiment example of the present invention.

Specifically, the AND operation is performed using the following formula:

value=$t(x−1,y−1)$&& $t(x,y−1)$&& $t(x+1,y−1)$&& $t(x−1,y)$&& $t(x,y)$&& $t(x+1,y)$&& $t(x−1,y+1)$&&$t(x,y+1)$&&$t(x+1,y+1)$).

Thus, the following formula can be used to calculate the pixel value de(x, y) at coordinates (x, y) in the eroded image:

$$de(x, y) = \begin{cases} 0; & value = 0 \\ nonzero\ value; & value \mathrel{!}= 0 \end{cases}$$

The eroded image f_erode can be obtained from the erosion operation through traversing all pixel points in the binary image.

Understandably, the erosion operation may be realized in any implementable manner or by any implementable algorithm; it is not restricted by the embodiment example of the present invention.

In a specific embodiment, the total number of pixels whose values are nonzero in the eroded image is calculated; the process proceeds to step S103 when the total number of pixels is greater than the first set threshold. If the total number of pixels is less than or equal to the first set threshold, it means that the number of pixels whose values are different in the first image and the second image is small, i.e. there is basically no difference between the first image and the second image, then it can be determined that a moving object is not present, and the process proceeds to re-obtain images to be examined, i.e. to re-execute step S101.

Preferably, step S101 may comprise the following steps: a difference operation is performed on all pixels in the first image and the second image and absolute values are obtained, in order to form a difference image; for each pixel in the difference image, if the pixel value is less than the pixel threshold, then the value of this pixel is assigned as 0, otherwise, the assigned value is the preset nonzero value, in order to form the binary image.

Specifically, a difference operation is performed on all pixels in the first image and the second image to obtain the difference image f_diff. The result from the difference operation is the pixel values in f_diff d(x, y) is the value of pixel p at coordinates (x, y) in the difference image f_diff. The following formula can be used to assign values for the difference image:

$$t(x, y) = \begin{cases} 0; & d(x, y) < \text{thresh} \\ \text{preset nonzero value}; & d(x, y) \geq \text{thresh} \end{cases}$$

The aforementioned operation is performed on all pixels in the difference image f_diff to obtain a binary image f_thresh. t(x, y) is the pixel value at coordinates (x, y) of the binary image f_thresh.

Understandably, in this embodiment example, the preset nonzero value may be 255; in specific embodiments, the preset nonzero value may also be any implementable value greater than 0, for example, 511, 127, 63, etc.; it is not restricted by the embodiment example of the present invention.

Figure 3:
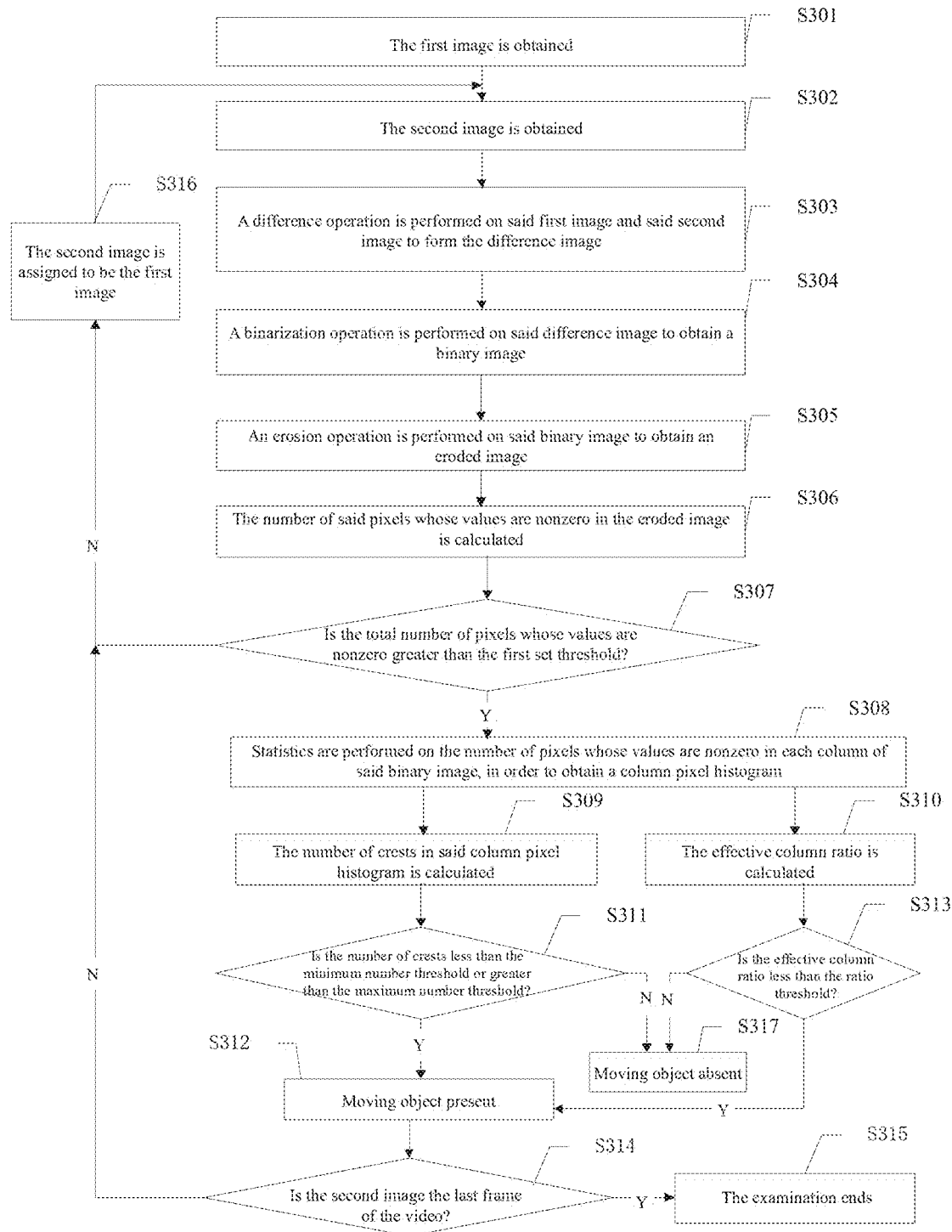
FIG. 3 is a flowchart of a method for detecting moving objects in an image, according to an exemplary embodiment of the present disclosure.

FIG. 3 is a flowchart of a method for detecting moving objects in an image, according to an exemplary embodiment of the present disclosure. For example, the moving objects to be detected may be flying insects.

In this embodiment example, a detailed description of the moving object detection method is provided using an example, where the first image and the second image are two adjacent image frames in an infrared video. Specifically, the infrared video may be a night vision video. In this embodiment example, the moving object detection is performed for all frames of images in the video.

As shown in FIG. 3, the first image is obtained in step S301; then the second image is obtained in step S302. Specifically, the second image may be the next adjacent image frame of the first image. In other words, when the location of the first image in the video is determined, the location of the second image can also be determined. For example, when the first image is the first image frame, the second image is the second image frame; when the first image is the third image frame, the second image is the fourth image frame.

In a specific embodiment, in step S303, a difference operation is performed on the first image and the second image to form the difference image. Specifically, the difference operation may be performed on the pixel value of all pixels in the first image and the second image.

Figure 4:
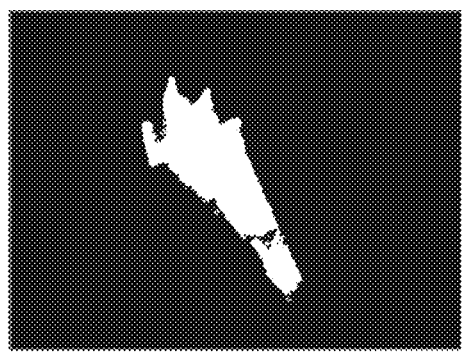
FIG. 4 is a schematic diagram illustrating a binary image, according to an exemplary embodiment of the present disclosure.

In step S304, a binarization operation is performed on the difference image to obtain a binary image. Specifically, the binary image has only two types of pixel values: zero and nonzero values. For example, 0 and 255. The binary image obtained is shown in FIG. 4, which is a diagram of a binary image in one embodiment example of the present invention.

In this embodiment example, the binary image can present the pixel difference between the first image and the second image in a more visual way.

In step S305, an erosion operation is performed on the binary image to obtain an eroded image. The purpose of the erosion operation on the binary image is to reduce the impact of noise on the detection of moving objects. Specifically, de(x, y) is defined as the pixel value at coordinates (x, y) in the eroded image, and the process of calculating de(x, y) is the image erosion operation. An AND operation is performed on the pixel values (zero and nonzero) of each pixel and its eight adjacent pixels, and value assignment is made based on the resulting value from the AND operation. The following formula can be used to calculate the pixel value de(x, y) at coordinates (x, y) in the eroded image:

$$de(x, y) = \begin{cases} 0; & \text{value} = 0 \\ 255; & \text{value} != 0 \end{cases}$$

The eroded image f_erode can be obtained from the erosion operation through traversing all pixel points in the binary image.

In step S306, the total number of pixels whose values are nonzero in the eroded image is calculated.

In step S307, a judgment is made on whether the total number of pixels whose values are nonzero is greater than the first set threshold; if it is, the process proceeds to step S308, otherwise the process proceeds to step S316. In other words, if the total number of pixels whose values are nonzero is greater than the first set threshold, it means that a difference exists between the first image and the second image, and the process may proceed to judge whether such difference is caused by a moving object. If the total number of pixels whose values are nonzero is less than or equal to the first set threshold, it means that there is basically no difference between the first image and the second image, and it can be determined that no moving object is present; thus, the process may proceed to re-obtain images to be examined. Therefore, in step S316, the second image is assigned to be the first image and the process proceeds to step S302, until all image frames of the video have been examined when the second image is judged as the last frame of the video in step S314.

Figure 5:
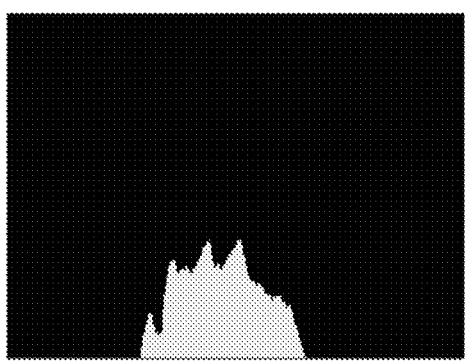
FIG. 5 is a schematic diagram illustrating a column pixel histogram, according to an exemplary embodiment of the present disclosure.

In step S308, statistics are performed on the number of pixels whose values are nonzero in each column of the binary image, in order to obtain a column pixel histogram. The column pixel histogram obtained from step S308 is shown in FIG. 5, which is a schematic diagram illustrating a column pixel histogram, according to an exemplary embodiment of the present disclosure.

Specifically, the number of pixels whose values are nonzero in each column of the binary image is obtained by performing statistics on the binary image, and the column pixel histogram is then obtained. In other words, in the column pixel histogram f_hist, the x-axis is the column of the binary image f_thresh, and the y-axis is the number of pixels whose values are nonzero in each column.

Specifically, in the column pixel histogram f_hist, the x-axis is the column of the binary image f_thresh, and the y-axis is the number of pixels whose values are nonzero in each column. Let t(x, y) be the pixel value at coordinates (x, y) in the binary image f_thresh, height be the height of the binary image f_thresh, and width be the width of the binary image f_thresh; let hist(x) be the y-coordinate of column x in the column pixel histogram f_hist. First, the following formula is used to initialize the y-coordinate hist(x) in the column pixel histogram f_hist: hist(x)=0; x=0, ..., width−1; then the following formula is used to calculate the y-coordinate hist(x) at x:

$$hist(x) = \begin{cases} hist(x); t(x, y) = 0 \\ hist(x) + 1; t(x, y) = 255 \end{cases}$$

$$x = 0, \ldots, \text{width} - 1; y = 0, \ldots, \text{height} - 1;$$

by this point, the column pixel histogram f_hist has been obtained.

In a specific embodiment, in steps S309 and S310, a judgment is made on whether a moving object is present using the two statistical results from the column pixel histogram f_hist.

In step S309, the number of crests in the column pixel histogram is calculated.

In step S311, a judgment is made on whether the number of crests is less than the minimum number threshold or greater than the maximum number threshold; if it is, then the process proceeds to step S312, otherwise the process proceeds to step S317.

Here, step S312 shows that a moving object is detected as a result; step S317 shows that no moving object is detected as a result and other objects (e.g. a pedestrian, a pet, etc.) may be present in the images.

In a specific embodiment, when determining the crests, not only should the y-coordinate value of the column where the crest is be greater than the crest threshold, the difference between the y-coordinate value of the column where the crest is and the y-coordinate value of the column that corresponds to the set x-axis interval should also be greater than the set difference threshold. Specifically, let hist(x) be the y-coordinate at x in the column pixel histogram f_hist, Δx be the x-axis interval, thresh be the set difference threshold, yThresh be the crest threshold, and CrestCount be the number of crests. Then when the following conditions are met simultaneously, the number of crests increases by one, CrestCount=CrestCount+1:

hist(x)−hist(x−Δx)>thresh;

hist(x)−hist(x+Δx)>thresh;

hist(x)>yThresh.

The number of crests CrestCount is obtained by traversing the x-axis of the column pixel histogram f_hist.

In a specific embodiment, the value range for the crest threshold yThresh may be [10, 30]; preferably, the crest threshold yThresh=20. Persons skilled in the art should understand that the crest threshold yThresh may also be configured at any other implementable numeric value depending on the actual application environment; it is not restricted by the embodiment example of the present invention.

Preferably, only one crest is retained among the columns within the set range interval in the column pixel histogram. In order to remove the impact of noise on the calculation result with regard to the number of crests, only one crest is retained among columns within the set range interval. Specifically, since the spatial distribution of the pixel difference between the first image and the second image due to the presence of a moving object exhibits certain characteristics, the number of crests can be used to determine whether a moving object is present. Let range be the range interval in the column pixel histogram f_hist, and x1 be the x-coordinate of a crest that already meets the aforementioned conditions, then when the following conditions are met simultaneously, the number of crests increases by one, CrestCount=CrestCount+1:

hist(x)−hist(x−Δx)>thresh;

hist(x)−hist(x+Δx)>thresh;

hist(x)>yThresh;

∃!x∈(x1−range,x1+range).

Further, when the number of crests is less than the minimum number threshold or greater than the maximum number threshold, it is determined that a moving object is present. Specifically, minNum is the minimum number threshold, and maxNum is the maximum number threshold, then when either of the following conditions is met, it is judged that a moving object is present:

CrestCount<minNum;

CrestCount>maxNum.

In a specific embodiment, the value range for the minimum number threshold may be [1, 3], and preferably the minimum number threshold minNum=2; the value range for the maximum number threshold may be [3, 7], and preferably the maximum number threshold maxNum=5; persons skilled in the art should understand that the minimum number threshold minNum and the maximum number threshold maxNum may also be configured at any other implementable numeric value depending on the actual application environment; they are not restricted by the embodiment example of the present invention.

In step S310, the effective column ratio is calculated. Specifically, noiseThresh is the noise threshold, filterCrestThreshCount is the number of columns greater than the crest threshold yThresh in the column pixel histogram f_hist, filterNoiseThreshCount is the number of columns greater than the noise threshold in the column pixel histogram f_hist, and ratio is the effective column ratio. The effective column ratio can be calculated using the following formula:

$$\text{ratio} = \frac{\text{fiterCrestThreshCount}}{\text{filterNoiseThreshCount}}.$$

In step S313, a judgment is made on whether the effective column ratio is less than the ratio threshold; if it is, then the process proceeds to step S312, otherwise the process proceeds to step S317.

Here, step S312 shows that a moving object is detected as a result; step S317 shows that no moving object is detected as a result and other objects (e.g. a pedestrian, a pet, etc.) may be present in the images.

Specifically, minRatio is the ratio threshold, then it is judged that a moving object is present when the following conditions are met:

ratio<minRatio.

In a specific embodiment, the value range for the noise threshold may be [3, 7], and preferably the noise threshold noiseThresh=5; the value range for the ratio threshold may be [0.1, 0.2], and preferably the ratio threshold minRatio=0.15; persons skilled in the art should understand that the noise threshold noiseThresh and the ratio threshold minRatio may also be configured at any other implementable numeric value depending on the actual application environment; they are not restricted by the embodiment example of the present invention.

In step S314, a judgment is made on whether the second image is the last frame of the video; if it is, then the process proceeds to step S315, otherwise the process proceeds to step S316.

Here, step S315 shows that the examination has ended, i.e. the examination of all image frames of this video has been completed; step S317 shows that in this video there is an image frame(s) yet to be examined, therefore, in step S316, the second image is assigned to be the first image and the process proceeds to step S302, until the second image is judged as the last frame of the video in step S314.

In this embodiment example of the present invention, the moving object detection method first obtains the pixel difference between two adjacent image frames of the video and binarizes the difference image; then it uses an erosion algorithm to erode the binary image, performs statistics on the number of pixels whose values are nonzero in the eroded image, and judges whether a moving object is present in the images. If a moving object is present, the number of pixels whose values are nonzero in each column in the binary image is obtained in order to obtain the column pixel histogram, and a judgment is made on whether a moving object is present based on the statistical results from the column pixel histogram.

After being tested in specific application scenarios, the moving object detection method provided by the embodiment example of the present invention is used for a large volume of testing of moving object detection in night vision (i.e. infrared) videos. Compared to the detection algorithms in the prior art, the moving object detection method provided by the present invention has a higher accuracy in identifying moving objects and lower rates of false positive error and false negative error.

Please see the relevant descriptions of embodiment examples shown in FIG. 1 and FIG. 2 for specific embodiments of this embodiment example; no redundant description is detailed here.

Figure 6:
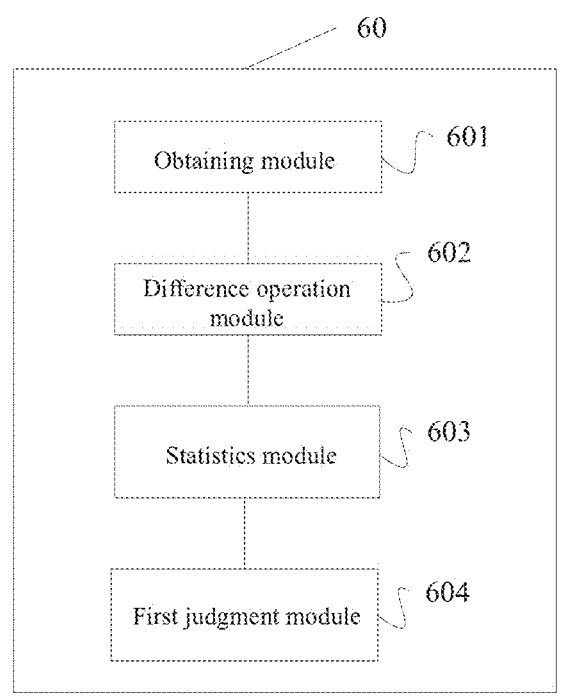
FIG. 6 is a block diagram of a device for detecting moving objects in an image, according to an exemplary embodiment of the present disclosure.

FIG. 6 is a block diagram of a device 60 for detecting moving objects in an image, according to an exemplary embodiment of the present disclosure. For example, the device 60 may be used to detect flying insects in a scene.

The device 60 shown in FIG. 6 may comprise an obtaining module 601, a difference operation module 602, a statistics module 603, and a first judgment module 604.

Here, the obtaining module 601 is suitable for obtaining the first image and the second image to be examined; the difference operation module 602 is suitable for performing a difference operation on the first image and the second image, and for performing a binarization operation on the result of the difference operation in order to obtain a binary image; the statistics module 603 is suitable for performing statistics on the number of pixels whose values are nonzero in each column of the binary image in order to obtain a column pixel histogram; the first judgment module 604 is suitable for determining whether a moving object is present based on the statistical results from the column pixel histogram.

In a specific embodiment, since a moving object in its moving process will form a trail in two consecutive images that are recorded, the trailing in the images can be used to detect moving objects. The recording time points of the first image and the second image that are obtained by the obtaining module 601 may be temporally consecutive.

Preferably, since a moving object in its moving process will form a trail in two consecutive images that are recorded using infrared recording, therefore, the first image and the second image can be infrared images; the first image and the second image can also be two adjacent image frames in an infrared video.

In a specific embodiment, the difference operation module 602 can perform a binarization operation on the result of the difference operation to obtain a binary image. In this embodiment example, the binary image can present the pixel difference between the first image and the second image in a more visual way.

In a specific embodiment, the statistics module 603 obtains the number of pixels whose values are nonzero in each column of the binary image by performing statistics on the binary image, and the column pixel histogram is then obtained. In this embodiment example, the column pixel histogram can present the spatial distribution of the pixel difference between the first image and the second image in a visual way. If the number of pixels whose values are nonzero in a certain column in the column pixel histogram is large, then it shows that difference is present in a relatively large number of pixels in this column of the first image and the second image; in contrast, if the number of pixels whose values are nonzero in a certain column in the column pixel histogram is small, then it shows that difference is present in a relatively small number of pixels in this column of the first image and the second image.

In a specific embodiment, the first judgment module 604 is suitable for determining whether a moving object is present based on the statistical results from the column pixel histogram. In other words, if a moving object is present in the first image and the second image, then it can be represented in the spatial distribution of the pixel difference between the first image and the second image, i.e. in the statistical results from the column pixel histogram. Therefore, the statistical results from the column pixel histogram can be used to determine whether a moving object is present.

In the embodiment example of the present invention, whether a moving object is present is determined by leveraging the uniqueness of the statistical results from the pixel difference values between the first image and the second image, which enables the detection of moving objects as distinguished from other objects in the images, further enabling better surveillance outcomes in application scenarios in multiple fields.

Figure 7:
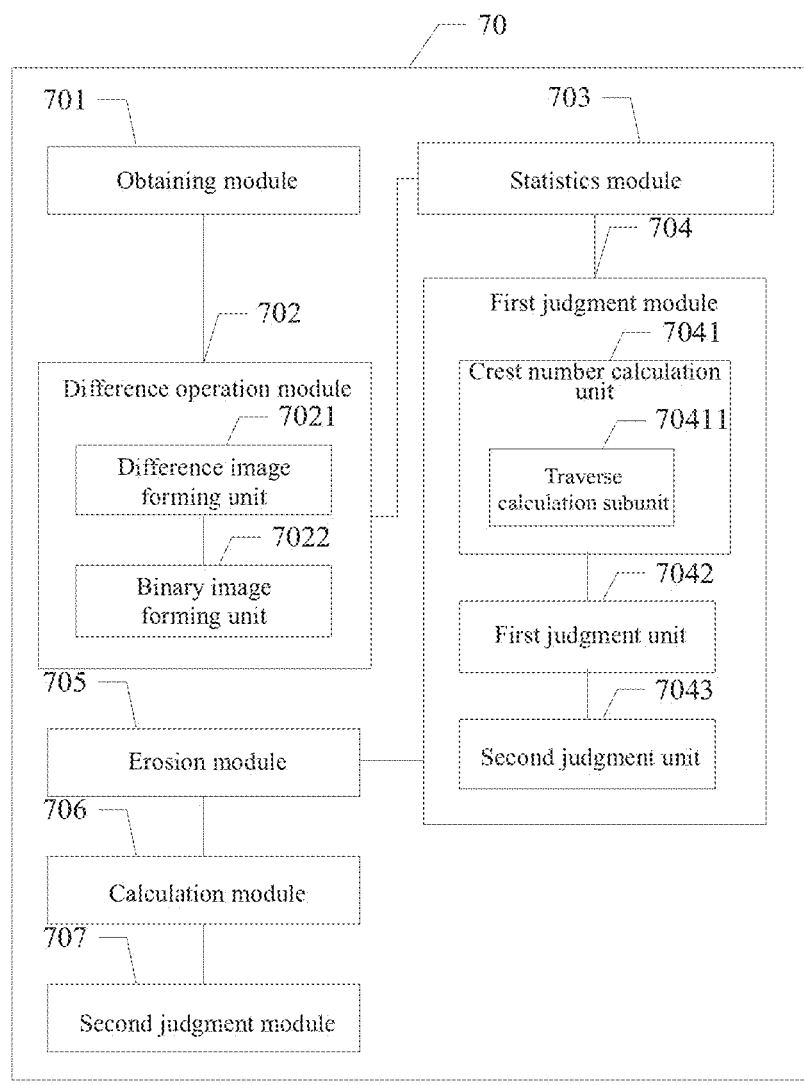
FIG. 7 is a block diagram of a device for detecting moving objects in an image, according to an exemplary embodiment of the present disclosure.

FIG. 7 is a block diagram of a device 70 for detecting moving objects in an image, according to an exemplary embodiment of the present disclosure. For example, the device 60 may be used to detect flying insects in a scene.

The device 70 shown in FIG. 7 may comprise an obtaining module 701, a difference operation module 702, a statistics module 703, and a first judgment module 704.

Here, the obtaining module 701 is suitable for obtaining the first image and the second image to be examined; the difference operation module 702 is suitable for performing a difference operation on the first image and the second image, and for performing a binarization operation on the result of the difference operation in order to obtain a binary image; the statistics module 703 is suitable for performing statistics on the number of pixels whose values are nonzero in each column of the binary image in order to obtain a column pixel histogram; the first judgment module 704 is suitable for determining whether a moving object is present based on the statistical results from the column pixel histogram.

Preferably, the statistical results from the column pixel histogram may comprise the number of crests and the effective column ratio.

Preferably, the first judgment module 704 may comprise a crest number calculation unit 7041 and a first judgment unit 7042. Here, the crest number calculation unit 7041 is suitable for calculating the number of crests in the column pixel histogram; the first judgment unit 7042 is suitable for determining whether a moving object is present based on the number of crests.

Further, the crest number calculation unit 7041 may comprise a traverse calculation subunit 70411. Here, the traverse calculation subunit 70411 is suitable for traversing all columns of the column pixel histogram; if in the column pixel histogram there is a column whose y-coordinate value is greater than the crest threshold, and the difference between the y-coordinate value and the y-coordinate value of the column that corresponds to the set x-axis interval is greater than the set difference threshold, then the number of crests increases by one.

Further, only one crest is retained among the columns within the set range interval in the column pixel histogram. In order to remove the impact of noise on the calculation result with regard to the number of crests, only one crest is retained among columns within the set range interval.

Preferably, the first judgment unit 7042 determines that a moving object is present when the number of crests is less than the minimum number threshold or greater than the maximum number threshold.

Preferably, the first judgment module 704 may comprise a second judgment unit 7043, and the second judgment unit 7043 is suitable for determining whether a moving object is present based on the effective column ratio; the effective column ratio is the ratio of the number of columns where the y-coordinate value is greater than the crest threshold to the number of columns where the y-coordinate value is greater than the noise threshold in the column pixel histogram. The effective column ratio is the ratio of the number of columns where the y-coordinate value is greater than the crest threshold to the number of columns where the y-coordinate value is greater than the noise threshold in the column pixel histogram. Specifically, since the spatial distribution of the pixel difference between the first image and the second image due to the presence of a moving object exhibits certain characteristics, the relationship between the columns where the difference exists and noise can be used to determine whether a moving object is present.

Specifically, since the number of pixels whose values are nonzero in each column of the binary image is different, statistics can be performed to obtain the number of crests in the column pixel histogram, i.e. the number of columns that stand out showing the number of nonzero pixels in the binary image. Since the spatial distribution of the pixel difference between the first image and the second image due to the presence of a moving object exhibits certain characteristics, the number of crests can be used to determine whether a moving object is present.

Further, the second judgment unit 7043 determines that a moving object is present when the effective column ratio is less than the ratio threshold. The effective column ratio is the ratio of the number of columns where the y-coordinate value is greater than the crest threshold to the number of columns where the y-coordinate value is greater than the noise threshold in the column pixel histogram. Specifically, since the spatial distribution of the pixel difference between the first image and the second image due to the presence of a moving object exhibits certain characteristics, the relationship between the columns where the difference exists and noise can be used to determine whether a moving object is present.

In the embodiment example of the present invention, results from statistics performed in different ways are used to determine whether a moving object is present, which can achieve diversity in the implementation of moving object detection and thus increase the accuracy of moving object detection.

Preferably, the moving object detection apparatus 70 shown in FIG. 7 may further comprise an erosion module 705, a calculation module 706, and a second judgment module 707. Here, the erosion module 705 is suitable for performing an erosion operation on the binary image to obtain an eroded image; the calculation module 706 is suitable for calculating the total number of pixels whose values are nonzero in the eroded image; and the second judgment module 707 is suitable for judging whether the total number of pixels is greater than the first set threshold, and the statistics module performs statistics on the number of pixels whose values are nonzero in each column of the binary image when the total number of pixels is greater than the first set threshold.

In a specific embodiment, in order to reduce the impact of noise on the detection of moving objects, an erosion operation can be performed on the binary image. If the total number of pixels whose values are nonzero in the eroded image is less than or equal to the first set threshold, it means that the number of pixels whose values are different in the first image and the second image is small, i.e. there is basically no difference between the first image and the second image, then it can be determined that a moving object is not present, and then the obtaining module 701 can re-obtain images to be examined. When the total number of pixels is greater than the first set threshold, the statistics module 703 can perform statistics on the number of pixels whose values are nonzero in each column of the binary image in order to obtain a column pixel histogram.

Preferably, the difference operation module 702 may comprise a difference image forming unit 7021 and a binary image forming unit 7022. The difference image forming unit 7021 is suitable for performing a difference operation on all pixels in the first image and the second image and obtaining absolute values in order to form a difference image; the binary image forming unit 7022 is suitable for assigning a value for each pixel in the difference image in order to form the binary image—if the pixel value is less than the pixel threshold, then the value of this pixel is assigned as 0, otherwise, the assigned value is the preset nonzero value.

Understandably, in this embodiment example, the preset nonzero value is 255; in specific embodiments, the preset nonzero value may also be any implementable value greater than 0, for example, 250, 225, 180, etc.; it is not restricted by the embodiment example of the present invention.

In the embodiment example of the present invention, whether a moving object is present is determined by leveraging the uniqueness of the statistical results from the pixel difference values between the first image and the second image, which enables the detection of moving objects as distinguished from other objects in the images, further enabling better surveillance outcomes in application scenarios in multiple fields.

In addition, the complexity of detecting moving objects using the moving object detection method provided by the embodiment example of the present invention and the amount of calculation required are both low, which may enhance the applicability of the moving object detection method.

Please refer to the relevant descriptions in FIGS. 1 through 3 for more information on the principles and ways of operating for the moving object detection apparatus 70; no redundant description will be detailed here.

An embodiment example of the present invention also discloses a terminal, and the terminal may comprise the moving object detection apparatus 60 in FIG. 6 or the moving object detection apparatus 70 in FIG. 7. Specifically, the moving object detection apparatus 70 may be internally integrated into or externally coupled to the terminal in order to be used to execute the steps shown in FIG. 1 or FIG. 3.

It is understandable to persons of ordinary skill in the art that all or part of the steps in the various methods in the aforementioned embodiment examples can be performed by using programs to command relevant hardware, and such programs may be stored in a computer-readable storage medium, which may include: ROMs, RAMs, disks, or CDs, etc.

Figure 8:
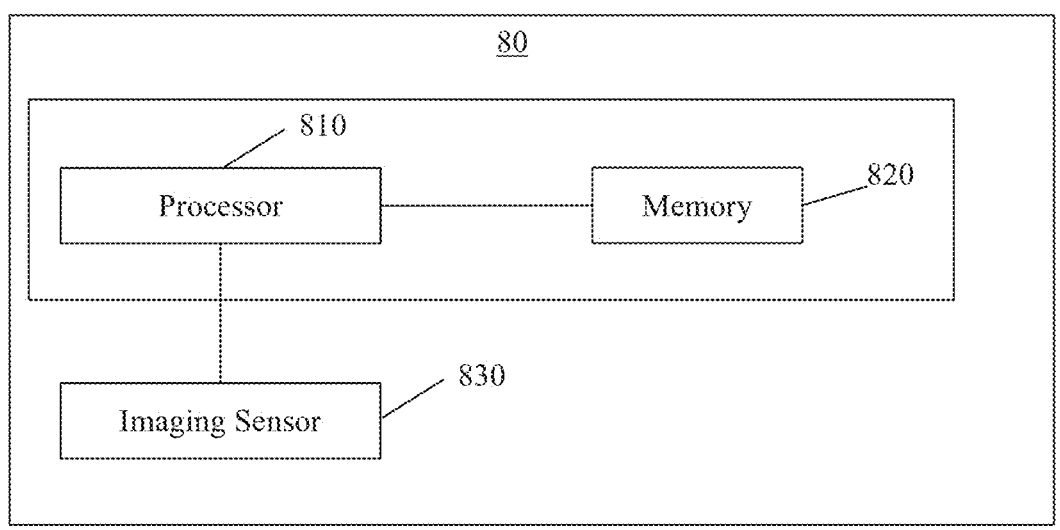
FIG. 8 is a block diagram of an image processing device, according to an exemplary embodiment of the present disclosure.

FIG. 8 is a block diagram of an image processing device 80, according to an exemplary embodiment of the present disclosure. As shown in FIG. 8, the image processing device 80 includes a processor 810 and a memory 820.

The memory 820 is configured to store instructions executable by the processor 810. The processor 810 is configured to execute the instructions to: obtain a first image and a second image of a scene; determine a difference of the first image and the second image; perform a binarization operation on the difference of the first image and the second image, to generate a binary image; determine the number of pixels whose values are nonzero in each column of the binary image, to generate a column pixel histogram; and determine whether a moving object is present in the scene based on the column pixel histogram. Details regarding the operation of the processor 810 can be referred to the above method embodiments, which are not repeated herein.

The image processing device 80 may also include an imaging sensor 830 configured to acquire images of a scene. The imaging sensor 830 may be a charge-coupled device (CCD) sensor or a complementary metal-oxide-semiconductor (CMOS) sensor. The imaging sensor 830 may also include any of optical devices, lens, CCD or CMOS driving circuitry, and other arrangements of optical components, electronic components, and control circuitry used in transmitting and receiving light of various wavelengths.

In example embodiments, the present disclosure also provides a non-transitory computer-readable storage medium including instructions. These instructions may be executed by a processor, such as the processor 820, to perform the methods described above. For example, the non-transitory computer-readable storage medium may be a read-only memory (ROM), a random access memory (RAM), a CD-ROM, a magnetic tape, a floppy disk, an optical data storage device, etc.

Consistent with the disclosed embodiments, the instructions may cause the processor to perform a moving object detection method including: obtaining a first image and a second image of a scene; determining a difference of the first image and the second image; performing a binarization operation on the difference of the first image and the second image, to generate a binary image; determining, in each column of the binary image, the number of pixels whose values are nonzero, to generate a column pixel histogram; and determining whether a moving object is present in the scene based on the column pixel histogram.

In some embodiments, the determining of whether a moving object is present in the scene based on the column pixel histogram further includes: determining the number of crests in the column pixel histogram; and determining whether a moving object is present in the scene based on the number of crests.

In some embodiments, the column pixel histogram has an x-axis corresponding to the columns of the binary image, and a y-axis corresponding to the number of pixels whose values are nonzero in each column of the binary image. As such, the determining of the number of crests in the column pixel histogram further includes: traversing all columns of the column pixel histogram; and if the column pixel histogram includes a first column whose y-coordinate value is greater than a crest threshold, determining a second column which is separate from the first column by a set distance along the x-axis, and increasing the number of crests by one when a difference between the y-coordinate value of the first column and a y-coordinate value of the second column is greater than a set difference threshold. In some embodiments, only one crest is retained within a set range along the x-axis of the column pixel histogram. In some embodiments, the determining of whether a moving object is present in the scene based on the number of crests further includes: when the number of crests is less than a minimum number threshold or greater than a maximum number threshold, determining that a moving object is present in the scene.

In some embodiments, the determining of whether a moving object is present in the scene based on the column pixel histogram further includes: determining whether a moving object is present in the scene based on an effective column ratio, the effective column ratio being a ratio of the number of columns in the column pixel histogram whose y-coordinate values are greater than a crest threshold to the number of columns in the column pixel histogram whose y-coordinate values are greater than a noise threshold. In one embodiment, the determining of whether a moving object is present in the scene based on the effective column ratio further includes: when the effective column ratio is less than a ratio threshold, determining that a moving object is present in the scene.

In some embodiments, determining, in each column of the binary image, the number of pixels whose values are nonzero further includes: performing an erosion operation on the binary image to obtain an eroded image; determining, in the eroded image, the number of pixels whose values are nonzero; and when the number of pixels in the eroded image whose values are nonzero is greater than a first set threshold, determining, in each column of the binary image, the number of pixels whose values are nonzero. In some embodiments, when the number of pixels in the eroded image whose values are nonzero is less than or equal to the first set threshold, obtaining new images of the scene to generate the column pixel histogram.

Notwithstanding the above disclosure of the present invention, it does not restrict the present invention. Any person of skill in the art may make various alterations and changes that are not detached from the spirit and scope of the present invention; therefore, the scope of protection for the present invention should be that as defined by the claims.

What is claimed is:

1. A method for detecting moving objects in an image, comprising:
   obtaining a first image and a second image of a scene;
   subtracting pixel values of the first image by pixel values of the second image, to generate difference values, and generating a difference image using absolute values of the determined difference values;

in the difference image, setting pixel values less than a threshold to be zero, and setting pixel values greater than or equal to the threshold to be a preset nonzero value, to generate a binary image;

determining, in each column of the binary image, the number of pixels whose values are nonzero, to generate a column pixel histogram; and determining whether a moving object is present in the scene based on the column pixel histogram.

2. The method according to claim 1, wherein determining whether a moving object is present in the scene based on the column pixel histogram comprises:

determining the number of crests in the column pixel histogram; and determining whether a moving object is present in the scene based on the number of crests.

3. The method according to claim 2, wherein:

a y-axis of the column pixel histogram corresponds to the number of pixels whose values are nonzero in each column of the binary image;

an x-axis of the column pixel histogram corresponds to the columns of the binary image; and determining the number of crests in the column pixel histogram comprises:

traversing all columns of the column pixel histogram; and if the column pixel histogram includes a first column whose y-coordinate value is greater than a crest threshold, determining a second column which is separate from the first column by a set distance along the x-axis, and increasing the number of crests by one when a difference between the y-coordinate value of the first column and a y-coordinate value of the second column is greater than a set difference threshold.

4. The method according to claim 3, wherein only one crest is retained within a set range along the x-axis of the column pixel histogram.

5. The method according to claim 2, wherein determining whether a moving object is present in the scene based on the number of crests comprises:

when the number of crests is less than a minimum number threshold or greater than a maximum number threshold, determining that a moving object is present in the scene.

6. The method according to claim 1, wherein:

a y-axis of the column pixel histogram corresponds to the number of pixels whose values are nonzero in each column of the binary image; and determining whether a moving object is present in the scene based on the column pixel histogram comprises:

determining whether a moving object is present in the scene based on an effective column ratio, the effective column ratio being a ratio of the number of columns in the column pixel histogram whose y-coordinate values are greater than a crest threshold to the number of columns in the column pixel histogram whose y-coordinate values are greater than a noise threshold.

7. The method according to claim 6, wherein determining whether a moving object is present in the scene based on the effective column ratio comprises:

when the effective column ratio is less than a ratio threshold, determining that a moving object is present in the scene.

8. The method according to claim 1, wherein determining, in each column of the binary image, the number of pixels whose values are nonzero comprises:

performing an erosion operation on the binary image to obtain an eroded image;

determining, in the eroded image, the number of pixels whose values are nonzero; and when the number of pixels in the eroded image whose values are nonzero is greater than a first set threshold, determining, in each column of the binary image, the number of pixels whose values are nonzero.

9. The method according to claim 8, further comprising:

when the number of pixels in the eroded image whose values are nonzero is less than or equal to the first set threshold, obtaining new images of the scene to generate the column pixel histogram.

10. The method according to claim 1, wherein the first image and the second image are two adjacent image frames in an infrared video.

11. An apparatus comprising:

a memory storing instructions; and a processor configured to execute the instructions to:

obtain a first image and a second image of a scene;

subtract pixel values of the first image by pixel values of the second image, to generate difference values, and generate a difference image using absolute values of the determined difference values;

in the difference image, set pixel values less than a threshold to be zero, and set pixel values greater than or equal to the threshold to be a preset nonzero value, to generate a binary image;

determine the number of pixels whose values are nonzero in each column of the binary image, to generate a column pixel histogram; and determine whether a moving object is present in the scene based on the column pixel histogram.

12. The apparatus according to claim 11, wherein the processor is further configured to execute the instructions to:

determine the number of crests in the column pixel histogram; and determine whether a moving object is present in the scene based on the number of crests.

13. The apparatus according to claim 12, wherein:

a y-axis of the column pixel histogram corresponds to the number of pixels whose values are nonzero in each column of the binary image;

an x-axis of the column pixel histogram corresponds to the columns of the binary image; and the processor is further configured to execute the instructions to:

traverse all columns of the column pixel histogram; and if the column pixel histogram includes a first column whose y-coordinate value is greater than a crest threshold, determine a second column which is separate from the first column by a set distance along the x-axis, and increase the number of crests by one when a difference between the y-coordinate value of the first column and a y-coordinate value of the second column is greater than a set difference threshold.

14. The apparatus according to claim 12, wherein in determining whether a moving object is present in the scene based on the number of crests, the processor is further configured to execute the instructions to:

when the number of crests is less than a minimum number threshold or greater than a maximum number threshold, determine that a moving object is present in the scene.

15. The apparatus according to claim 11, wherein:

a y-axis of the column pixel histogram corresponds to the number of pixels whose values are nonzero in each column of the binary image; and the processor is further configured to execute the instructions to:

determine whether a moving object is present in the scene based on an effective column ratio, the effective column ratio being a ratio of the number of columns in the column pixel histogram whose y-coordinate values are greater than a crest threshold to the number of columns in the column pixel histogram whose y-coordinate values are greater than a noise threshold.

16. The apparatus according to claim 15, wherein in determining whether a moving object is present in the scene based on the effective column ratio, the processor is further configured to execute the instructions to:

when the effective column ratio is less than a ratio threshold, determine that a moving object is present in the scene.

17. The apparatus according to claim 11, wherein the processor is further configured to execute the instructions to:

perform an erosion operation on the binary image to obtain an eroded image;

determine, in the eroded image, the number of pixels whose values are nonzero; and when the number of pixels in the eroded image whose values are nonzero is greater than a first set threshold, determine, in each column of the binary image, the number of pixels whose values are nonzero.

18. The apparatus according to claim 17, wherein the processor is further configured to execute the instructions to:

when the number of pixels in the eroded image whose values are nonzero is less than or equal to the first set threshold, obtain new images of the scene to generate the column pixel histogram.

19. A non-transitory computer-readable storage medium storing instructions that, when executed by a processor, cause the processor to perform a moving object detection method comprising:

obtaining a first image and a second image of a scene;

subtracting pixel values of the first image by pixel values of the second image, to generate difference values, and generating a difference image using absolute values of the determined difference values;

in the difference image, setting pixel values less than a threshold to be zero, and setting pixel values greater than or equal to the threshold to be a preset nonzero value, to generate a binary image;

determining the number of pixels whose values are nonzero in each column of the binary image, to generate a column pixel histogram; and determining whether a moving object is present in the scene based on the column pixel histogram.

* * * * *